(12) United States Patent
Gagas et al.

(10) Patent No.: US 12,237,791 B2
(45) Date of Patent: Feb. 25, 2025

(54) METHOD AND SYSTEM FOR CONTROLLING COMMON MODE ELECTRIC CURRENT IN AN ELECTRIC MACHINE

(71) Applicant: GM GLOBAL TECHNOLOGY OPERATIONS LLC, Detroit, MI (US)

(72) Inventors: Brent S. Gagas, Pleasant Ridge, MI (US); Kerrie M. Spaven, Rochester Hills, MI (US); Brian J. Gallert, Lake Orion, MI (US); Daniel J. Berry, Macomb Township, MI (US); Brian A. Welchko, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 18/182,640

(22) Filed: Mar. 13, 2023

(65) Prior Publication Data

US 2024/0313686 A1   Sep. 19, 2024

(51) Int. Cl.
*H02P 27/08* (2006.01)
*H02P 21/00* (2016.01)

(52) U.S. Cl.
CPC ........ *H02P 27/085* (2013.01); *H02P 21/0003* (2013.01)

(58) Field of Classification Search
CPC .................. H02P 27/085; H02P 21/0003
USPC ................................... 318/400.09
See application file for complete search history.

(56) References Cited

U.S. PATENT DOCUMENTS

| | | | |
|---|---|---|---|
| 9,800,183 B1 * | 10/2017 | Wang | H02P 6/08 |
| 2017/0033722 A1 * | 2/2017 | Ochs | H02P 27/085 |
| 2017/0229937 A1 * | 8/2017 | Pedersen | H02K 7/183 |
| 2018/0076744 A1 * | 3/2018 | Wolf | H02P 6/10 |
| 2018/0219499 A1 * | 8/2018 | Kano | H02P 29/027 |
| 2021/0143693 A1 * | 5/2021 | Nehl | H02K 3/24 |
| 2021/0159826 A1 * | 5/2021 | Fatemi | H02P 21/0003 |

* cited by examiner

Primary Examiner — Gabriel Agared
(74) Attorney, Agent, or Firm — Quinn IP Law

(57) ABSTRACT

A method, apparatus, and control system are described for operating a multiphase motor drive system including a rotary electric machine and an inverter. An AC choke filter is arranged proximal to output leads from the inverter. A reference temperature associated with the AC choke filter is determined along with an operating point of the electric machine. Operation of the inverter is controlled based upon a temperature of the AC choke filter, the reference temperature, and an operating point of the electric machine. This includes modifying a switching frequency and a PWM type in a manner that reduces the AC choke filter temperature by reducing the occurrence of switching events to protect the AC choke filter based on temperature feedback.

20 Claims, 3 Drawing Sheets

METHOD AND SYSTEM FOR CONTROLLING COMMON MODE ELECTRIC CURRENT IN AN ELECTRIC MACHINE

In a multi-phase rotary electric machine, traction torque or reactive torque may be generated by multiple alternating current (AC) waveforms that pass through three or more phase leads. A power inverter may be configured to generate multiple AC waveforms that operate at the same frequency and amplitude, but with a time offset or phase shift between the different phases. In a vehicle or other system using an electric machine, the power inverter generates phased AC waveforms that are transferred to individual stator windings of the rotary electric machine to induce a changing magnetic field. This magnetic field causes the rotation of a rotor to occur, which in turn provides motor output torque or regenerative torque. The motor output torque may be harnessed and directed to perform useful work, e.g., propelling the vehicle.

Under some operating conditions, common mode electrical power may be generated and transferred through bearings of the rotary electric machine. This may lead to deterioration of the bearings, which may be in the form of fluting, pitting, or other effects. This deterioration of the bearings may cause issues related to noise and vibration, may lead to a bearing fault that may require service, and/or may decrease service life of a rotary electric machine.

In some cases, an AC choke filter may be arranged between an inverter and stator winding of a rotary electric machine to reduce a common mode current and mitigate, reduce, or eliminate bearing currents. An AC choke filter may generate heat in-use due to the common mode current. However, the magnitude of common mode is not proportional to either speed or torque of the rotary electric machine.

SUMMARY

There is a need for a rotary electric machine and an associated inverter and control system that are capable of adjusting or adapting pulsewidth modulated (PWM) control signals for the inverter under some operating conditions in a manner that minimizes or eliminates common mode electric current through the bearing(s) of the rotary electric machine employing an AC choke filter, avoids excessive heat generation by the operation of the AC choke filter, and minimizes effect upon noise-vibration-harshness (NVH) parameters.

The concepts described herein provide a method, apparatus, and system for controlling an inverter by modifying duty cycles of the PWM control signals in a manner that reduces the AC choke filter temperature by reducing the occurrence of switching events. Reducing the occurrence of switching events is achieved by modifying the switching frequency and PWM type, and serves to protect the AC choke filter by overriding the PWM strategy based on temperature feedback.

An aspect of the disclosure may include a control system for a multi-phase rotary electric machine having an inverter configured to transfer electric energy between a rechargeable energy storage device (RESS) and the multi-phase rotary electric machine via a plurality of output leads; an AC choke filter, wherein the AC choke filter is arranged proximal to the plurality of output leads; a temperature monitor, wherein the temperature monitor is arranged to determine a temperature of the AC choke filter; and a controller, wherein the controller is operatively connected to the inverter and in communication with the temperature monitor. The controller includes an instruction set that is executable to: determine a reference temperature associated with the AC choke filter, determine an operating point of the electric machine, and control operation of the inverter based upon the temperature of the AC choke filter, the reference temperature, and the operating point of the electric machine.

Another aspect of the disclosure may include the instruction set being executable to control the inverter to operate the multi-phase rotary electric machine based upon the temperature of the AC choke filter, the reference temperature, and the operating point of the electric machine.

Another aspect of the disclosure may include the instruction set being executable to adjust a switching frequency for the inverter to achieve a temperature of the AC choke filter that is less than the reference temperature for the operating point of the electric machine.

Another aspect of the disclosure may include the instruction set being executable to reduce the switching frequency for the inverter to reduce the temperature of the AC choke filter.

Another aspect of the disclosure may include the instruction set being executable to determine a PWM control strategy for the inverter based upon the temperature of the AC choke filter, the reference temperature, and the operating point of the electric machine.

Another aspect of the disclosure may include the PWM control strategy being one of a space-vector PWM (SVPWM) switching strategy and a discontinuous PWM (DPWM) switching strategy, wherein the instruction set is executable to transition between the DPWM switching strategy and the SVPWM switching strategy to achieve a temperature of the AC choke filter that is less than the reference temperature for the operating point of the electric machine.

Another aspect of the disclosure may include the instruction set being executable to: determine, for each of a plurality of candidate PWM control strategies, an effect on a noise-vibration-harshness parameter (NVH); and select one of the candidate PWM control strategies based upon the temperature of the AC choke filter, the reference temperature, and the operating point of the electric machine, wherein the one of the candidate PWM control strategies is selected to minimize the effect on NVH.

Another aspect of the disclosure may include a control system for a multi-phase rotary electric machine that includes an inverter configured to transfer electric energy between a rechargeable energy storage device (RESS) and the multi-phase rotary electric machine via a plurality of output leads; an AC choke filter, wherein the AC choke filter is arranged proximal to the plurality of output leads; a temperature monitor, wherein the temperature monitor is arranged to determine a temperature of the AC choke filter; and a controller, the controller being operatively connected to the inverter and in communication with the temperature monitor. The controller includes an instruction set that is executable to determine a commanded output from the multi-phase rotary electric machine, determine a reference temperature associated with the AC choke filter, determine an operating point of the electric machine, and control operation of the inverter in response to the commanded output and based upon the temperature of the AC choke filter, the reference temperature, and the operating point of the electric machine.

Another aspect of the disclosure may include a method for controlling an inverter of a multi-phase rotary electric machine that includes: arranging an AC choke filter proximal to a plurality of output leads coupled between the inverter and the multi-phase rotary electric machine; determining, via a temperature sensor or a software estimation, a temperature of the AC choke filter; determining a reference temperature associated with the AC choke filter; determining an operating point of the electric machine; and controlling operation of the inverter based upon the temperature of the AC choke filter, the reference temperature, and the operating point of the electric machine.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
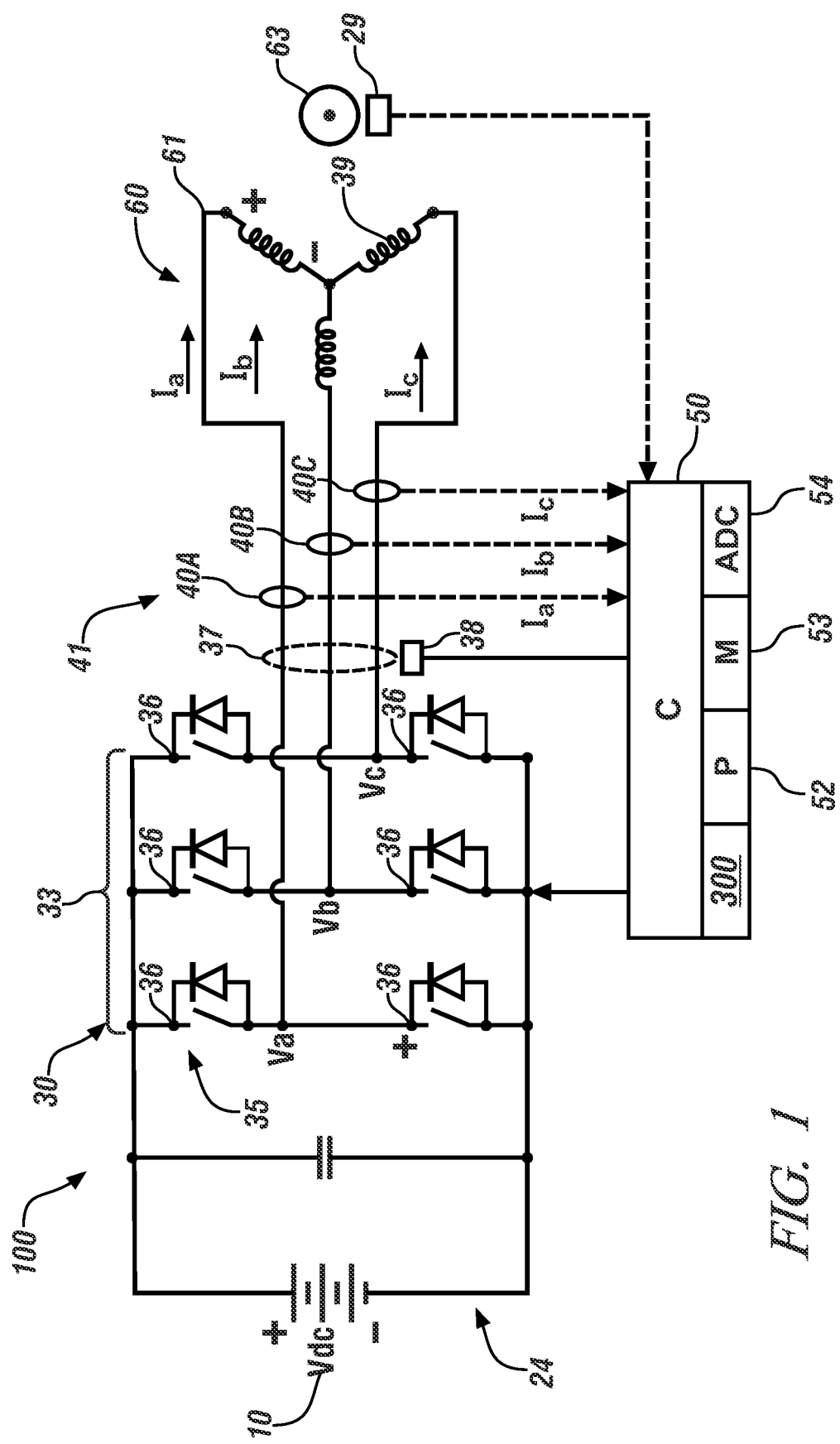
FIGS. 1 and 2 schematically illustrate details of a multi-phase rotary electric machine and control system, in accordance with the disclosure.

The appended drawings may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, some technical material that is understood in the related art has not been described in detail to avoid unnecessarily obscuring the disclosure.

For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. Throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Exemplary embodiments may be described herein in terms of functional and/or logical block components and various processing steps. Such block components may be realized by a combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with other mechanical and/or electronic systems, and that the vehicle systems described herein are merely exemplary embodiment of possible implementations.

The use of ordinals such as first, second and third does not necessarily imply a ranked sense of order, but rather may distinguish between multiple instances of an act or structure.

Figure 2:
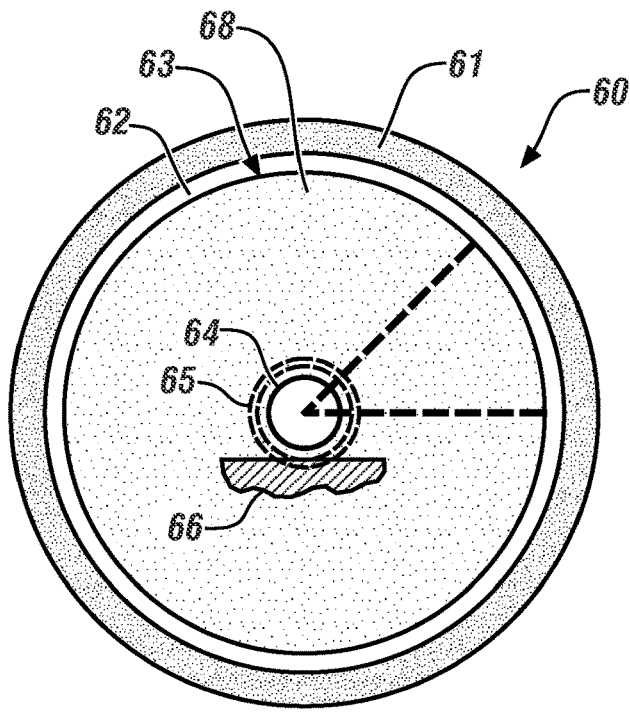

Referring to the drawings, wherein like reference numerals correspond to like or similar components throughout the several Figures, FIGS. 1 and 2, consistent with embodiments disclosed herein, illustrate a non-limiting example of a multi-phase motor drive system 100. In one embodiment, the multi-phase motor drive system 100 may be disposed to provide propulsion torque in a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The multi-phase motor drive system 100 includes a rechargeable energy storage device (RESS) 10, a multi-phase rotary electric machine 60, an inverter 30, and a controller (C) 50. The inverter 30 transforms DC electric energy from the RESS 10 to AC electric energy that is supplied to phases of the multi-phase rotary electric machine 60 to generate torque in response to control commands from the controller 50.

In one embodiment, the inverter includes an AC choke filter 37. In one embodiment, the AC choke filter 37 includes an inductor that is in-line or is placed proximal to output leads 41 between the power switches 35 and the rotary electric machine 60. In one embodiment, the AC choke filter 37 is a toroidal-shaped ferritic device that partially or completely encircles the output leads 41 between the switches 35 and the rotary electric machine 60. The AC choke filter 37 is an inductor having low DC resistance and extremely high AC reactance, in one embodiment. Thus, ripples due to switching are filtered, i.e., attenuated, although some of the residual ripples may be present. The AC choke filter 37 may experience elevated temperatures in operation. A temperature sensor 38 may be arranged to monitor temperature of the AC choke filter 37 in one embodiment. Alternatively, the temperature of the AC choke filter 37 may be determined by a temperature model that is based upon the phase currents delivered to the electric machine 60 as measured via phase current sensors 40A, 40B, 40C, and/or P-N junction temperatures that are measured by the plurality of first temperature sensors 36 of the plurality of power switches 35.

The controller 50 is programmed in software and equipped in hardware to execute recorded instructions embodying an AC choke filter thermal protection control routine 300.

The RESS 10 is a rechargeable device, e.g., a multi-cell lithium-ion battery or nickel metal hydride battery that supplies electric power (Vdc) to a high-voltage DC bus 24.

Elements of the multi-phase rotary electric machine 60 are described with reference to FIG. 2. FIG. 2 schematically illustrates a cross-sectional end-view of an embodiment of a permanent magnet rotary electric machine 60 including an annular-shaped stator 61 that forms a cylindrically shaped void into which a coaxial rotor 63 is inserted, with an airgap 62 formed between the stator 61 and the rotor 63. The rotor 63 is arranged on a rotatable shaft 64 having ends that extend through apertures formed in endcaps 68 of the stator 61, with mounting 66 and bearings 65 arranged therein. A rotational position/speed sensor 29 is arranged to monitor rotation position and/or rotational speed of the rotor 63. The shaft 64 defines a longitudinal axis with radial lines extending orthogonal to the longitudinal axis. The stator 61 houses a plurality of electrical windings (shown as elements 39 in FIG. 1) that are circumferentially arranged. The electrical windings are electrically connected to the inverter 30, which is controlled by controller 50 to generate rotating electrical fields that induce magnetic fields adjacent to the rotor 63 and interact with the magnetic field of the permanent magnets to generate mechanical torque in the rotor 63. The rotary electric machine 60 may be controlled to operate as a torque motor and/or an electric power generator. Details related to a physical configuration and operation of a permanent magnet rotary electric machine 60 are known to those skilled in the art, and thus not described in detail herein.

The inverter 30 is configured as a plurality of power switches 35 that are arranged as a plurality of power switch pairs 33 that electrically connect in series between the positive and negative conductors of the high-voltage DC bus 24, which is connected to the RESS 10. As shown, the rotary electric machine 60 is configured as a three-phase device, and the inverter 30 includes three power switch pairs 33, each of which is connected to one of the phases (a, b, or c) of the rotary electric machine 60. Each of the power switches 35 of the power switch pairs 33 may be an Insulated Gate Bipolar Transistor (IGBT) having a diode arranged in parallel, or another suitable high-voltage switch, e.g., a Field-Effect Transistor (FET) or a Silicon-Carbide (SIC) FET. The controller 50 includes an inverter gate drive circuit having a plurality of gate drives and a controller, wherein the inverter gate drive circuit generates control signals to control activation and deactivation of the power switches 35 in response to the control signals, e.g., pulsewidth modulated (PWM) control signals, which originate from the motor control system 50. The inverter 30 includes other electrical components including capacitors, resistors and other electrical circuit components to accomplish functions related to electrical noise suppression, load balancing and the like.

The inverter 30 may employ pulsewidth modulating (PWM) control of the IGBTs to convert stored DC electric power originating in the RESS 10 to AC electric power to drive the rotary electric machine 60 to generate torque. Similarly, the power inverter 30 converts mechanical power transferred to the rotary electric machine 60 to DC electric power to generate electric energy that is storable in the RESS 10, including as part of a regenerative braking control strategy when employed on-vehicle. The power inverter 30 receives motor control commands from the controller 50 and controls inverter states to provide the motor drive and regenerative braking functionality.

Control of AC motor/generators, such as three-phase permanent magnet synchronous rotary electric machines (electric machines) is accomplished using a three-phase pulsewidth modulated (PWM) inverter. A PWM inverter can be controlled in several different operating modes, including, e.g., a linear modulation mode and an over-modulation mode. One example of a linear modulation mode of operation is a space vector PWM (SVPWM) mode with linear modulation, e.g., up to 90% of a six-step operation, and one example of an over-modulation mode is a full six-step mode. Another example of a linear modulation mode of operation is discontinuous pulsewidth modulation (DPWM). An example of a low speed mode of operation is a zero vector pulsewidth modulation (ZWM).

Each of the power switches 35 has a first temperature sensor 36 that is arranged to monitor temperature at or near a P-N junction thereof, and is in communication with the controller 50. Each of the first temperature sensors 36 may be a thermistor in one embodiment. Alternatively, the first temperature sensors 36 may be thermocouple junctions or other temperature monitoring devices, without limitation. Alternatively, virtual temperature models may be employed in software in place of the first temperature sensors 36.

The phase currents delivered to the electric machine 60 are individually and separately measured via phase current sensors 40A, 40B, 40C using a measurement process. The phase current sensors 40A, 40B, 40C may be Hall effect sensors in one embodiment.

The controller 50 includes a processor (P) 52 and tangible, non-transitory memory (M) 53 on which is recorded instructions embodying the AC choke filter thermal protection control routine 300. The controller 50 may also include an analog-to-digital converter (ADC) 54. The ADC 54 may be embodied as an electrical circuit providing a specific sampling rate which provides quantization of the continuous/analog voltage input and outputs a representative digital signal. The memory 53 may include read-only memory (ROM), flash memory, optical memory, additional magnetic memory, etc., as well as random access memory (RAM), electrically programmable read-only memory (EPROM), a high-speed clock, analog-to-digital (A/D) and/or digital-to-analog (D/A) circuitry, input/output circuitry or devices, and signal conditioning and buffer circuitry.

The controller 50 commands or causes the inverter 30 to generate a set of pulsewidth modulation signals (arrow PWM). These PWM signals provide switching control of the input voltage used to power the multi-phase electric machine 60. The controller 50 receives the three measured phase current signals from the phase current sensors 40A, 40B, 40C.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices. The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and similar signals that are capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value. The term "model" refers to processor-based or processor-executable code and associated calibration that simulates a physical existence of a device or a physical process.

Figure 3:
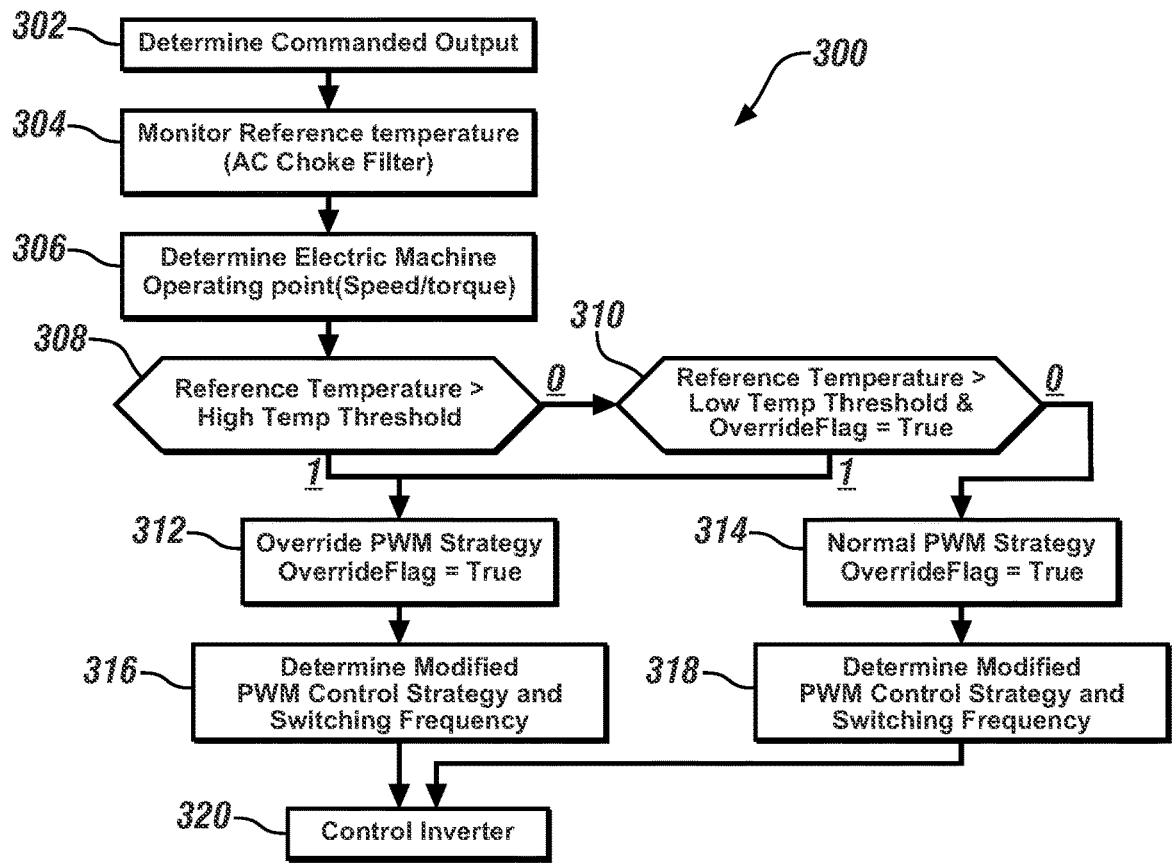
FIG. 3 schematically illustrates an embodiment of an AC choke filter thermal protection control routine, in accordance with the disclosure.

FIG. 3 schematically illustrates an embodiment of the AC choke filter thermal protection control routine 300 for controlling operation of the inverter 30 of the multi-phase motor drive system 100 to control speed and torque output of the multi-phase rotary electric machine 60, embodiments of which are described with reference to FIG. 1.

The control routine 300 is periodically executed by the controller 50. In operation, the control routine 300 determines a commanded output from the multi-phase rotary electric machine, which may be in the form of a commanded speed/torque operating point (Step 302), and also monitors the temperature sensor 38 to determine a reference temperature for the AC choke filter 37 (Step 304). The reference temperature may be determined based on a flexible calculation that may include a direct measurement of the AC choke filter 37 via temperature sensor 38, based upon inverter and motor coolant temperatures, or using other temperature estimation or determination techniques. A high temperature threshold may be calibrated based on the drive unit configuration to establish maximum boundary conditions for normal operation before overriding the PWM strategy using a modified PWM strategy.

A present speed/torque operating point for the multi-phase rotary electric machine is also determined (Step 306).

The reference temperature for the AC choke filter 37 is compared to the high temperature threshold (Step 308).

The high temperature threshold represents a maximum temperature at which the inverter 30 and/or the AC choke filter 37 is able to operate without inducing short-term or long-term deterioration or degradation of the components, interfaces, junctions, etc.

When the reference temperature for the AC choke filter 37 is less than the high temperature threshold (Step 308)(0), the reference temperature for the AC choke filter 37 is compared to a low temperature threshold (Step 310). One purpose of the low temperature threshold is to introduce hysteresis into the decision making process related to modifying the PWM control strategy.

When the reference temperature for the AC choke filter 37 is less than the low temperature threshold or an override command flag is false (Step 310)(0), a baseline PWM control strategy is employed (Step 314). The controller 50 determines a PWM control strategy including PWM switching frequency based upon the commanded output from the multi-phase rotary electric machine in the form of the commanded speed/torque operating point determined in Step 302 and the present speed/torque operating point for the multi-phase rotary electric machine determined in Step 306 (Step 318). Operation of the inverter is controlled based thereon (Step 320).

Figure 4:
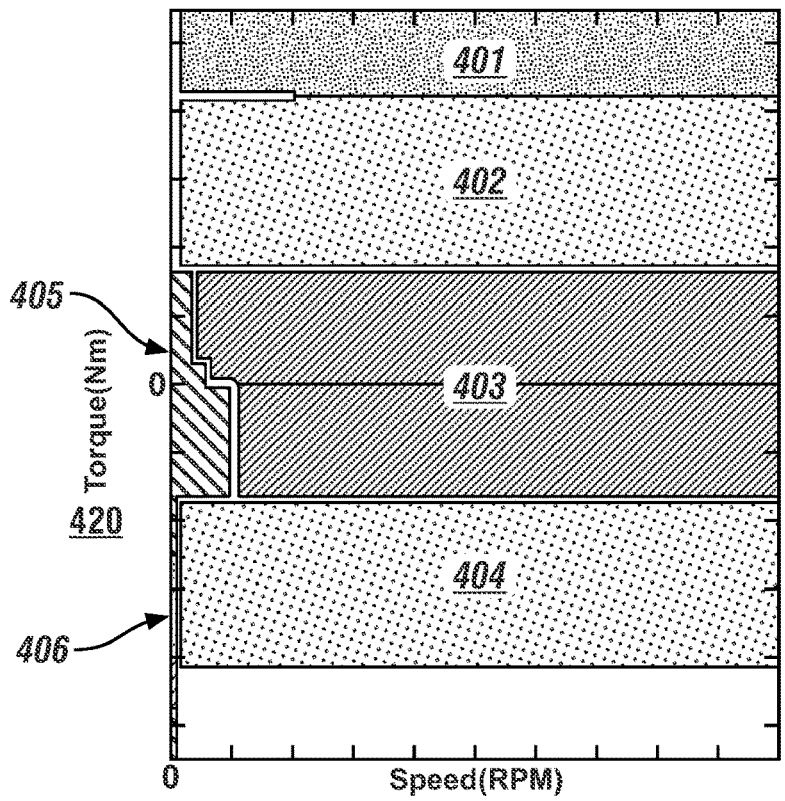
FIG. 4 graphically illustrates an embodiment of a baseline PWM control strategy for controlling an embodiment of the multi-phase rotary electric machine, in accordance with the disclosure.

FIG. 4 graphically illustrates an embodiment of a baseline PWM control strategy 400 for controlling an embodiment of the multi-phase rotary electric machine 60. Rotational speed 410 is depicted on the horizontal axis, and torque 420 is depicted on the vertical axis. A plurality of regions are indicated, including a first region 401 associated with high positive torque; a second region 402 associated with a medium positive torque; a third region 403 associated with low positive torque at a speed greater than a minimum speed, e.g., 1500 RPM, and a low negative torque at a speed greater than the minimum speed; a fourth region 404 associated with a medium negative torque, a fifth region 405 associated with a low positive torque at a speed less than the minimum speed, and a low negative torque at a speed less than the minimum speed; and a sixth region 406 associated with a medium or high negative torque at or near zero conditions, i.e., a stall condition.

Specific PWM control strategies and PWM switching frequencies are selected and implemented for operating the inverter 30 and the electric machine for each of the regions, including a PWM switching frequency based upon the commanded output from the multi-phase rotary electric machine in the form of the commanded speed/torque operating point. By way of non-limiting example, when the commanded speed/torque operating point is in the first region 401, the inverter 30 is commanded to operate using a DPWM control strategy at 10 kHz. When the commanded speed/torque operating point is in the second region 402 or the fourth region 404, the inverter 30 is commanded to operate using a SVPWM control strategy at 10 kHz. When the commanded speed/torque operating point is in the third region 403, the inverter 30 is commanded to operate using a DPWM control strategy at 20 kHz. When the commanded speed/torque operating point is in the fifth region 405, the inverter 30 is commanded to operate using a SVPWM control strategy at 10 kHz. When the commanded speed/torque operating point is in the sixth region 406, the inverter 30 is commanded to operate using a ZWM control strategy.

Referring again to FIG. 3, when the reference temperature for the AC choke filter 37 is greater than the high temperature threshold (Step 308)(1), or the reference temperature for the AC choke filter 37 greater than the low temperature threshold and the override command flag is true (Step 310)(1), a PWM override strategy is implemented (Step 312).

The PWM override strategy includes determining and implementing a modified PWM control strategy including adjusting the PWM switching frequency to control the inverter 30 to induce conditions that reduce the temperature of the AC choke filter 37 and also account for and minimize an effect on NVH (noise-vibration-harshness) (Step 316). The effect on NVH may be induced by operating the inverter 30 using the modified PWM control strategy including adjusting the PWM switching frequency.

Figure 5:
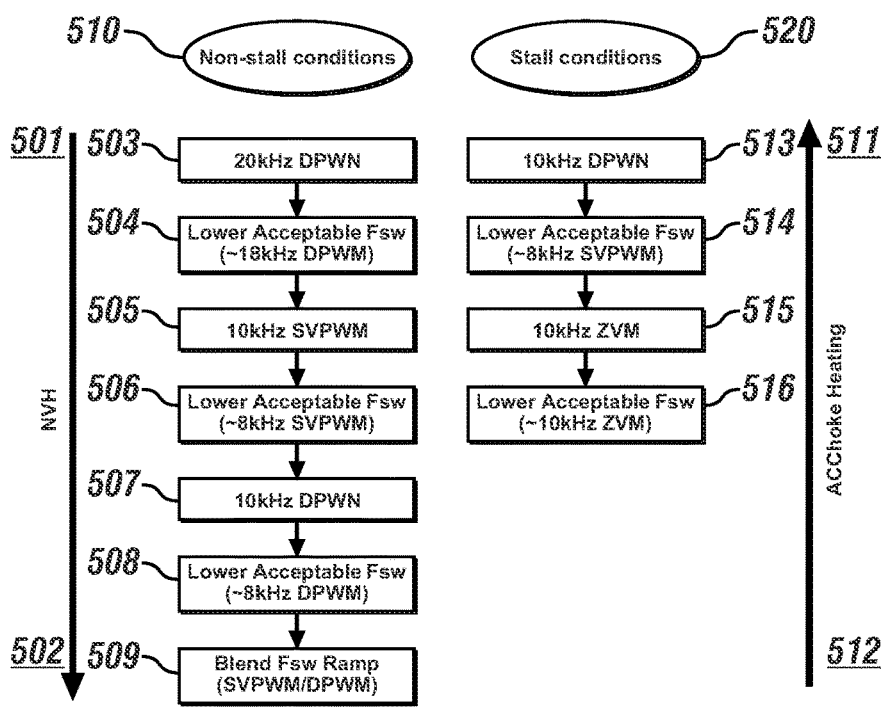
FIG. 5 graphically illustrates a plurality of modified PWM control strategies under non-stall conditions and stall conditions that may be selected and employed by a PWM override strategy, in accordance with the disclosure.

FIG. 5 graphically illustrates a plurality of modified PWM control strategies under non-stall conditions (510) and stall conditions (520) that may be selected and employed by the PWM override strategy (Step 316 of FIG. 3).

A Blended SVPWM/DPWM Ramped Switching Frequency PWM strategy may be employed to reduce AC choke filter temperature by using a combination of SVPWM and DPWM and ramped switching frequency to minimize average number of switching events while having acceptable NVH for various vehicle applications. Audible noise is higher than acceptable for a fixed or constant switch frequency, but ramping the switch frequency linearly with vehicle speed provides a coherent sound character. SVPWM enables the use of a lower initial switch frequency compared to using DPWM alone.

The plurality of modified PWM control strategies under non-stall conditions (510) are depicted in relation to their effect upon NVH between a minimum effect upon NVH (501) and a maximum effect upon NVH (502). The modified PWM control strategies under non-stall conditions, described in context of increasing effect upon NVH include: operating using a DPWM control strategy at 20 kHz (503); operating using a DPWM control strategy at a switching frequency (Fsw) less than 20 kHz. e.g., 18 kHz (504); operating using a SVPWM control strategy at 10 kHz (505); operating using a SVPWM control strategy at a switching frequency (Fsw) less than 10 kHz (506); operating using a DPWM control strategy at 10 kHz (507); operating using a DPWM control strategy at a switching frequency (Fsw) less than 10 kHz (508); and operating using a blend of a SVPWM control strategy and a DPWM control strategy (509).

The plurality of modified PWM control strategies under stall conditions (520) are depicted in relation to their effect upon AC choke filter heating between a minimum effect upon AC choke filter heating (512) and a maximum effect upon AC choke filter heating (511). The modified PWM control strategies under stall conditions, described in context of decreasing effect upon AC choke filter heating include: operating using a SVPWM control strategy at 10 kHz (513); operating using a SVPWM control strategy at a switching frequency (Fsw) that is less than 10 kHz (514); operating using a ZWM control strategy at a switching frequency of 10 kHz (515); and operating using a ZWM control strategy at a switching frequency (Fsw) that is less than 10 kHz (516).

The modified PWM control strategies under non-stall conditions (510) and stall conditions (520).

In this manner, an AC choke filter may be implemented into hardware to reduce common mode currents, and thus reduce, mitigate, or eliminate deterioration of bearing materials due to switching events. To protect the AC choke filter from overheating, a derating strategy 300 is applied by overriding the PWM strategy when the AC choke filter temperature exceeds a specific temperature threshold. Temperature feedback may be estimated by a thermal algorithm, directly measured by a temperature sensor, or otherwise determined. If there is no temperature feedback the override strategy may be applied based on an established maximum boundary condition using existing temperature sensors on a vehicle such as the inverter and motor coolant temperatures.

Furthermore, the AC choke filter thermal protection control routine 300 may protect the AC choke filter by overriding the PWM strategy based on the HV DC bus voltage. Bus voltage directly scales the magnitude of the both the common mode and bearing currents. The override strategy at high and low Vdc may differ based on what strategy is needed to keep the AC choke filter in an acceptable temperature range.

Furthermore, the AC choke filter thermal protection control routine 300 provides a PWM override strategy to protect the AC choke filter while minimizing impact to NVH or performance at all operating points.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A control system for a multi-phase rotary electric machine, comprising:
   an inverter configured to transfer electric energy between a rechargeable energy storage device (RESS) and the multi-phase rotary electric machine (electric machine) via a plurality of output leads;
   an AC choke filter that includes an inductor that is in-line or is placed, wherein the AC choke filter is arranged proximal to the plurality of output leads;
   a temperature monitor, wherein the temperature monitor is arranged to determine a temperature of the AC choke filter; and
   a controller, the controller being operatively connected to the inverter and in communication with the temperature monitor;
   the controller including an instruction set, the instruction set being executable to:
   determine a reference temperature associated with the AC choke filter,
   determine an operating point of the electric machine, and
   control operation of the inverter based upon the temperature of the AC choke filter, the reference temperature, and the operating point of the electric machine.

2. The control system of claim 1, wherein the instruction set is executable to control the inverter to operate the electric machine based upon the temperature of the AC choke filter, the reference temperature, and the operating point of the electric machine.

3. The control system of claim 1, wherein the instruction set being executable to control operation of the inverter based upon the temperature of the AC choke filter, the reference temperature, and the operating point of the electric machine comprises the instruction set being executable to adjust a switching frequency for the inverter to achieve a temperature of the AC choke filter that is less than the reference temperature for the operating point of the electric machine.

4. The control system of claim 3, wherein the instruction set being executable to adjust the switching frequency for the inverter to achieve a temperature of the AC choke filter that is less than the reference temperature for the operating point of the electric machine comprises the instruction set being executable to reduce the switching frequency for the inverter to reduce the temperature of the AC choke filter.

5. The control system of claim 1, wherein the instruction set being executable to control operation of the inverter comprises the instruction set being executable to determine a PWM control strategy for the inverter based upon the temperature of the AC choke filter, the reference temperature, and the operating point of the electric machine.

6. The control system of claim 5, wherein the PWM control strategy comprises one of a space-vector PWM (SVPWM) switching strategy and a discontinuous PWM (DPWM) switching strategy, and wherein the instruction set being executable to control operation of the inverter based upon the temperature of the AC choke filter, the reference temperature, and the operating point of the electric machine comprises the instruction set being executable to transition between the DPWM switching strategy and the SVPWM switching strategy to achieve a temperature of the AC choke filter that is less than the reference temperature for the operating point of the electric machine.

7. The control system of claim 5, comprising the instruction set being executable to:
   determine, for each of a plurality of candidate PWM control strategies, an effect on a noise-vibration-harshness (NVH) parameter; and
   select one of the candidate PWM control strategies based upon the temperature of the AC choke filter, the reference temperature, and the operating point of the electric machine, wherein the one of the candidate PWM control strategies is selected to minimize the effect on the NVH parameter.

8. A control system for a multi-phase rotary electric machine (electric machine), comprising:
   an inverter configured to transfer electric energy between a rechargeable energy storage device (RESS) and the electric machine via a plurality of output leads;
   an AC choke filter that includes an inductor that is in-line or is placed, wherein the AC choke filter is arranged proximal to the plurality of output leads;
   a temperature monitor, wherein the temperature monitor is arranged to determine a temperature of the AC choke filter; and
   a controller, the controller being operatively connected to the inverter and in communication with the temperature monitor;
   the controller including an instruction set, the instruction set being executable to:
   determine a commanded output from the electric machine;
   determine a reference temperature associated with the AC choke filter,
   determine an operating point of the electric machine, and
   control operation of the inverter in response to the commanded output and based upon the temperature of the AC choke filter, the reference temperature, and the operating point of the electric machine.

9. The control system of claim 8 wherein the instruction set is executable to control the inverter to operate the electric machine in response to the commanded output and based upon the temperature of the AC choke filter, the reference temperature, and the operating point of the electric machine.

10. The control system of claim 8, wherein the instruction set being executable to control operation of the inverter in response to the commanded output and based upon the temperature of the AC choke filter, the reference temperature, and the operating point of the electric machine comprises the instruction set being executable to adjust a switching frequency for the inverter to achieve a temperature of the AC choke filter that is less than the reference temperature for the operating point of the electric machine.

11. The control system of claim 10, wherein the instruction set being executable to adjust the switching frequency for the inverter to achieve a temperature of the AC choke filter that is less than the reference temperature for the operating point of the electric machine comprises the instruction set being executable to reduce the switching frequency for the inverter to reduce the temperature of the AC choke filter.

12. The control system of claim 8, wherein the instruction set being executable to control operation of the inverter comprises the instruction set being executable to determine a PWM control strategy for the inverter in response to the commanded output and based upon the temperature of the AC choke filter, the reference temperature, and the operating point of the electric machine.

13. The control system of claim 12, wherein the PWM control strategy comprises one of a space-vector PWM (SVPWM) switching strategy and a discontinuous PWM (DPWM) switching strategy, and wherein the instruction set being executable to control operation of the inverter in response to the commanded output and based upon the temperature of the AC choke filter, the reference temperature, and the operating point of the electric machine comprises the instruction set being executable to transition between the DPWM switching strategy and the SVPWM switching strategy to achieve a temperature of the AC choke filter that is less than the reference temperature for the operating point of the electric machine.

14. The control system of claim 12, comprising the instruction set being executable to:
   determine, for each of a plurality of candidate PWM control strategies, an effect on a noise-vibration-harshness (NVH) parameter; and
   select one of the candidate PWM control strategies based upon the temperature of the AC choke filter, the reference temperature, and the operating point of the electric machine, wherein the one of the candidate PWM control strategies is selected to minimize the effect on the NVH parameter.

15. A method for controlling an inverter of a multi-phase rotary electric machine (electric machine), the method comprising:
   arranging an AC choke filter that includes an inductor that is in-line or is placed proximal to a plurality of output leads coupled between the inverter and the electric machine;
   determining, via a temperature sensor, a temperature of the AC choke filter;
   determining a reference temperature associated with the AC choke filter;
   determining an operating point of the electric machine; and controlling operation of the inverter based upon the temperature of the AC choke filter, the reference temperature, and the operating point of the electric machine.

16. The method of claim 15, wherein controlling operation of the inverter based upon the temperature of the AC choke filter, the reference temperature, and the operating point of the electric machine comprises adjusting a switching frequency for the inverter to achieve a temperature of the AC choke filter that is less than the reference temperature for the operating point of the electric machine.

17. The method of claim 16, wherein adjusting the switching frequency for the inverter to achieve a temperature of the AC choke filter that is less than the reference temperature for the operating point of the electric machine comprises reducing the switching frequency for the inverter to reduce the temperature of the AC choke filter.

18. The method of claim 15, wherein controlling the operation of the inverter comprises determining a PWM control strategy for the inverter based upon the temperature of the AC choke filter, the reference temperature, and the operating point of the electric machine.

19. The method of claim 18, wherein the PWM control strategy comprises one of a space-vector PWM (SVPWM) switching strategy and a discontinuous PWM (DPWM) switching strategy, and wherein controlling operation of the inverter based upon the temperature of the AC choke filter, the reference temperature, and the operating point of the electric machine comprises transitioning between the DPWM switching strategy and the SVPWM switching strategy to achieve a temperature of the AC choke filter that is less than the reference temperature for the operating point of the electric machine.

20. The method of claim 18, comprising:
determining, for each of a plurality of candidate PWM control strategies, an effect on a noise-vibration-harshness (NVH) parameter; and
selecting one of the candidate PWM control strategies based upon the temperature of the AC choke filter, the reference temperature, and the operating point of the electric machine, wherein the one of the candidate PWM control strategies is selected to minimize the effect on the NVH parameter.

* * * * *